Patented Oct. 28, 1941

2,260,338

UNITED STATES PATENT OFFICE 2,260,338

(TERTIARYBUTYL-ARYL) BORATES

Ralph F. Prescott, Robert C. Dosser, and John J. Sculati, Midland, Mich., assignors to The Dow Chemical Company, Midland, Mich., a corporation of Michigan No Drawing. Application September 16, 1940, Serial No. 356,984

4 Claims. (Cl. 260—462)

This invention concerns a novel group of aromatic borates having the general formula

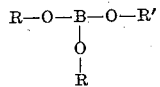

where R represents an aromatic radical, and R' represents a tertiarybutyl-aryl radical of the benzene series. These compounds are viscous liquids, some of which solidify on standing. They are substantially colorless and odorless, somewhat soluble in many common organic solvents, and decompose on contact with water. They are useful in the preparation of fungicidal and germicidal compositions. A particular application consists of a substantially non-aqueous solution of the borate which may be diluted with water to obtain relatively fine dispersions of the particular phenols concerned in a dilute solution of boric acid.

The term "tertiarybutyl-aryl" as herein employed refers to the tertiarybutyl-phenyl radicals as derived from the tertiarybutyl-phenols and to the analogues and homologues thereof, wherein the benzene nucleus is further substituted by relatively inert groupings such as alkyl, halogen, aralkyl, alkoxy, and the like.

The new compounds are prepared by reacting a tertiarybutyl-phenol or phenol mixture comprising tertiarybutyl-phenol with boric acid, preferably in a media consisting of a water-immiscible organic solvent. In carrying out the reaction the phenol and boric acid are dispersed in the solvent and the mixture heated. The reaction temperature is preferably between about 90° and 180° C., although somewhat higher or lower temperatures may be employed, depending upon the particular solvent or phenol employed. Reaction is conveniently carried out at the boiling temperature of the mixture. Water is formed by the reaction of the phenol with the boric acid and is removed from the reaction zone along with a portion of the organic solvent as a steam distillate. While any suitable proportions of reactants may be employed, from about 2 to 4 molecular equivalents of the phenol for each molecular equivalent of boric acid has been found to give the desired compounds in good yield. The amount of water-immiscible solvent employed is not critical provided only that sufficient be maintained in the reaction zone to be steam-distilled along with the water formed. We generally employ sufficient of the solvent so that the phenol is dissolved during reaction and the final product is obtained as a solution. When the reaction is completed, i. e. when water is no longer evolved, the reacted mixture may be fractionally distilled to separate the solvent. The residue from such separation consists essentially of a mixture of organic borates in which the triaromatic borate predominates. This residue may be employed in the preparation of fungicidal and germicidal compositions without further purification or may be fractionally distilled to separate the triaromatic borate in substantially pure form and to recover unreacted phenolic residues and mono- and diaromatic borate compounds.

The following example illustrates the invention but is not to be construed as limiting the same:

Example 150 grams (1 mol) of 4-tertiarybutyl-phenol, 42 grams (0.67 mol) of boric acid and 300 milliliters of ortho-dichloro-benzene were mixed together and heated to the boiling temperature of the mixture. Water was formed in the reaction and continuously distilled out of the reaction zone along with a portion of the ortho-dichloro-benzene as a steam distillate. When no more water was evolved, the mixture was cooled to room temperature and fractionally distilled under reduced pressure to recover the ortho-dichloro-benzene and to separate 112 grams of tri-(4-tertiarybutyl-phenyl) borate as a thick viscous liquid boiling at 275°–280° C. at 0.1 inch pressure. This compound was soluble in many common organic solvents and decomposed on contact with water.

In a similar manner other tertiarybutyl-phenols and nuclearly-substituted derivatives thereof may be reacted with boric acid to obtain compounds analogous to that described above. Representative of such phenols are 2-tertiarybutyl-phenol, 3-tertiarybutyl-phenol, 2-chloro-4-tertiarybutyl-phenol, 2,4-ditertiarybutyl-phenol, 2,4,5-tritertiarybutyl-phenol, 2,6-dibromo-4-tertiarybutyl-phenol, 2-methyl-4-tertiarybutyl-phenol, 2-benzyl-4-tertiarybutyl-phenol, 2-methoxy-4-tertiarybutyl-phenol, and the like.

While the compound set forth in the example is a triaromatic derivative of boric acid, wherein the three substituting aromatic groups are similar, compounds in which dissimilar radicals are embodied may be obtained by reacting mixed phenols with boric acid. For example, such compounds as mono-(4-tertiarybutyl-phenyl)-diphenyl borate may be formed by reacting a mixture of two molecular equivalents of phenol and one molecular equivalent of 4-tertiarybutyl-phenol with one molecular equivalent of boric acid. Similarly, isomeric mixtures of the tertiarybutyl-phenols and nuclearly-substituted derivatives thereof, such as chlorotertiarybutylphenols may be reacted with boric acid to obtain mixed triaryl borates. Such compounds have particular utility where it is desired to obtain germicidal or fungicidal compositions which will be effective against a wide range of organisms, since many phenols are relatively specific in their action.

The present application is a continuation-in-part of our copending applications Serial Numbers 299,698 and 299,699, filed October 16, 1939.

Other modes of applying the principles of our invention may be employed instead of those explained, change being made as regards the materials employed provided the products described by any of the following claims be thereby obtained.

We, therefore, particularly point out and distinctly claim as our invention:

1. A compound having the formula

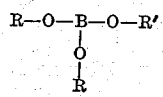

wherein R represents an aromatic radical, and R' represents a tertiarybutyl-aryl radical of the benzene series.

2. A compound having the formula

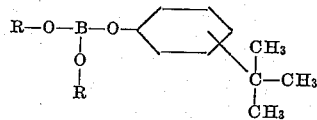

wherein R represents an aromatic radical.

3. Tri-(4-tertiarybutyl) borate.

4. A compound having the formula

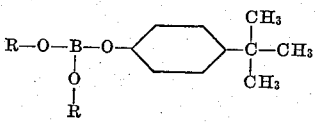

wherein R represents an aromatic radical.

RALPH F. PRESCOTT.
ROBERT C. DOSSER.
JOHN J. SCULATI.